United States Patent
Ward

(10) Patent No.: US 8,771,478 B2
(45) Date of Patent: Jul. 8, 2014

(54) DISTILLATION APPARATUS

(75) Inventor: Dudley Edgar James Ward, Auckland (NZ)

(73) Assignee: Equus Environmental Ltd., Auckland (NZ)

( * ) Notice: Subject to any disclaimer, the term of this patent is extended or adjusted under 35 U.S.C. 154(b) by 983 days.

(21) Appl. No.: 12/597,620

(22) PCT Filed: Apr. 24, 2008

(86) PCT No.: PCT/NZ2008/000091
§ 371 (c)(1),
(2), (4) Date: Apr. 29, 2010

(87) PCT Pub. No.: WO2008/130254
PCT Pub. Date: Oct. 30, 2008

(65) Prior Publication Data
US 2010/0200388 A1    Aug. 12, 2010

Related U.S. Application Data

(60) Provisional application No. 60/913,731, filed on Apr. 24, 2007.

(51) Int. Cl.
*B01D 1/22*    (2006.01)
*B01D 1/28*    (2006.01)
*B01D 3/10*    (2006.01)
*B01D 3/28*    (2006.01)

(52) U.S. Cl.
USPC .......... 203/11; 159/24.1; 159/24.2; 159/28.6; 159/49; 159/DIG. 16; 165/115; 165/166; 196/111; 196/114; 196/125; 196/134; 202/176; 202/182; 202/197; 202/205; 202/236; 203/23; 203/24; 203/89; 203/94; 203/98

(58) Field of Classification Search
USPC .............. 159/5, 24.1, 24.2, 28.6, 46, 49, 901, 159/DIG. 16; 165/115, 133, 166; 202/176, 202/182, 197, 205, 236; 203/11, 23, 24, 39, 203/89, 94, 98, DIG. 7, DIG. 8; 196/111, 196/114, 125, 134; 210/774
See application file for complete search history.

(56) References Cited

U.S. PATENT DOCUMENTS 3,783,108 A * 1/1974 Huhta Koivisto ............... 203/11
4,227,373 A   10/1980 Amend et al.
(Continued)

FOREIGN PATENT DOCUMENTS

AU    199473061    3/1995
GB    1082428      9/1967
(Continued)

*Primary Examiner* — Virginia Manoharan
(74) *Attorney, Agent, or Firm* — King & Schickli, PLLC

(57) ABSTRACT

A modular distillation apparatus including at least one heat exchanger that preheats contaminated liquids: a heater that heats the contaminated liquid from the heat exchanger; an evaporator condenser adapted o boil the contaminated liquid coming out of the heater to produce water vapor and contaminant concentrate, and condenser the water vapor into distilled water; a vacuum chamber capable of operating at below atmospheric pressure, the vacuum chamber housing the evaporator condenser and including at least one partition to separate the distilled water from the contaminate concentrate; a vapor compressor operably associated with the vacuum chamber to receive water vapor from the evaporator condenser in the vacuum chamber and pump the water vapor at pressure back through the evaporator condenser, wherein the heat exchanger recovers sensible heat from outgoing condensed distilled water and contaminant concentrate recycled from the vacuum chamber.

24 Claims, 5 Drawing Sheets

(56) References Cited

U.S. PATENT DOCUMENTS

| | | | | |
|---|---|---|---|---|
| 4,698,136 A | * | 10/1987 | El-Allawy | 203/11 |
| 5,306,397 A | | 4/1994 | Schmidt | |
| 5,587,054 A | * | 12/1996 | Keith | 202/182 |
| 5,810,975 A | * | 9/1998 | Bourdel | 202/176 |
| 5,853,549 A | | 12/1998 | Sephton | |
| 7,955,476 B2 | * | 6/2011 | Mansur | 202/160 |
| 8,206,557 B2 | * | 6/2012 | Burke et al. | 202/182 |
| 2002/0117293 A1 | * | 8/2002 | Campbell | 165/133 |
| 2003/0127400 A1 | * | 7/2003 | Kresnyak et al. | 210/767 |
| 2005/0045466 A1 | * | 3/2005 | Bitterly et al. | 203/100 |
| 2005/0072662 A1 | * | 4/2005 | Holtzapple et al. | 202/155 |

FOREIGN PATENT DOCUMENTS

| | | |
|---|---|---|
| GB | 1541317 | 2/1979 |
| WO | WO 01/05709 | 1/2001 |
| WO | WO 01/56934 | 8/2001 |

\* cited by examiner

DISTILLATION APPARATUS

This application is a national stage of PCT/NZ2008/000091, filed Apr. 24, 2008, the disclosure of which is incorporated herein by reference, which claims the benefit of U.S. Provisional Patent Application Ser. No. 60/913,731, filed Apr. 24, 2007.

TECHNICAL FIELD

The present invention relates to a distillation apparatus. In particular the present invention relates to a distillation apparatus capable of producing distilled water from contaminated liquids using heat distillation under a vacuum and including recycling 10 of latent and sensible heat within the apparatus to improve energy efficiency.

BACKGROUND

Traditionally liquid distillation systems, such as those used in desalination, ground water remediation or liquid recycling plants, have high energy requirements which can account for between 50% and 70% of the total operating costs of such a plant. These high operating costs can make such plants prohibitively expensive and impractical, particularly for applications in developing countries and in locations without a reliable energy supply.

In addition, known methods of liquid treatment such as reverse osmosis, utilising activated carbon filtration and optionally ultra-violet or ozone exposure, typically do not have the capacity for efficient treatment of heavily contaminated liquids such as sea water or brackish water and usually require pre-treatment such as pre-filtration and/or chemical treatment. Such known treatment methods produce waters which have total dissolved solid (TDS) concentrations of 500 to 1000 ppm which can result in treated water with odor and/or unpleasant aftertaste and is too saline to use for agricultural irrigation. Additionally, filtration can lead to operational problems such as filter clogging and the need for sterilization of the filtration apparatus on a regular basis to prevent build-up of mold, algae and bacteria contaminants.

A further disadvantage with known liquid treatment systems is the lack of portability to a site and scalability on site in situations where increased capacity is required quickly such as in emergency relief situations.

It is an object of the present invention to address the foregoing problems or at least to provide the public with a useful choice.

Further aspects and advantages of the present invention will become apparent from the ensuing description which is given by way of example only

SUMMARY

According to one aspect of the present invention there is provided a distillation apparatus to produce distilled water from a contaminated liquid including:
  at least one heat exchanger that preheats the contaminated liquid;
  a heater that heats the contaminated liquid from the heat exchanger;
  a degasser to remove non-condensable gases from the heated contaminated liquid from the heater;
  an evaporator condenser adapted to
    boil the contaminated liquid from the heater to produce water vapor and contaminant concentrate, and
    condense the water vapor into distilled water;
  a vacuum chamber capable of operating at below atmospheric pressure, the vacuum chamber housing the evaporator condenser and including at least one partition to separate the distilled water from the contaminant concentrate;
  a vapor compressor operably associated with the vacuum chamber to receive water vapor from the evaporator condenser in the vacuum chamber and pump the water vapor at pressure back through the evaporator condenser
  wherein
    the at least one heat exchanger recovers sensible heat from outgoing condensed distilled water and contaminant concentrate recycled from the vacuum chamber;
    the evaporator condenser transfers the latent heat from the condensing water vapor to boil the contaminated liquid, and
    the distillation apparatus operates as an standalone unit.

Preferably, the distillation apparatus includes a vacuum pump operably associated with the vacuum chamber.

Preferably, the evaporator condenser boils the contaminated liquid in the temperature range 40° C. to 100° C.

Preferably, the evaporator condenser includes a plurality of non-porous plates, each of the plates having a surface which on contact boils the contaminated liquid to produce water vapor and a surface which on contact condenses the water vapor into distilled water.

Preferably, the plurality of non-porous plates has a hydrophilic outer surface.

Preferably, the hydrophilic plates have a thickness of between 0.1 mm to 0.25 mm.

Preferably, the vacuum chamber further includes at least one baffle to accelerate vapor velocity to separate droplets of boiling liquid residues from the vapor.

Preferably, the vacuum chamber includes at least one transparent and removable panel.

Preferably, the evaporator condenser is a rising film or a falling film type heat exchanger.

Preferably, the evaporator condenser operates in a vacuum inside the vacuum 10 chamber.

Preferably, the vacuum chamber further includes a means to circulate the water vapor to accelerate vapor condensation.

Preferably, the distillation apparatus further includes a contaminated liquid pump to pump contaminated liquid into the at least one heat exchanger.

Preferably, the distillation apparatus further includes a distillate pump to pump the distilled water from the vacuum chamber through the at least one heat exchanger.

Preferably, the distillation apparatus further includes a concentrated contaminated liquid pump to pump the concentrated contaminated liquid through the at least one heat exchanger.

Preferably, the distillation apparatus may be housed and transported within ISO shipping containers with like distillation apparatus.

Preferably, the distillation apparatus may operate for a continuous period without interruption.

DETAILED DESCRIPTION

Figure 1:
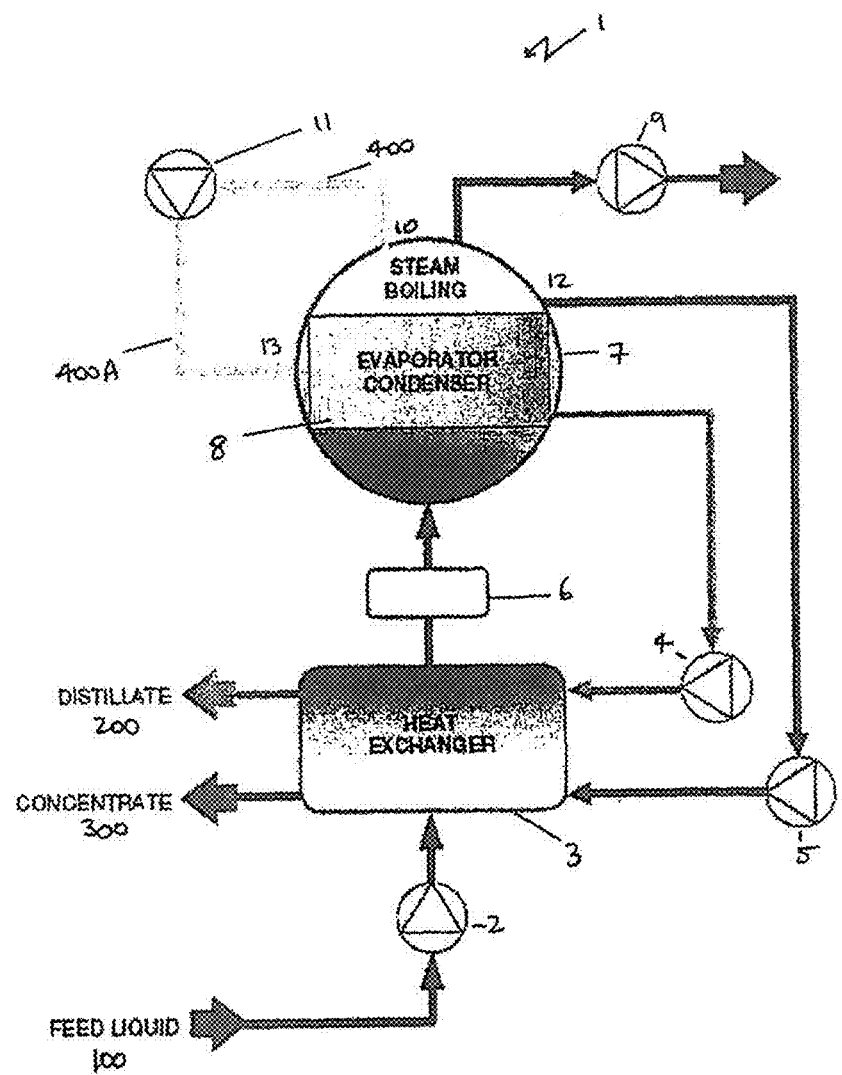
FIG. 1 shows a schematic view of the process followed by the distillation 5 apparatus of the present invention.

FIG. 1 shows a schematic view of the distillation apparatus generally indicated by arrow 1. Contaminated liquid 100 is pumped by feed pump 2 and preheated on passing through a heat exchanger 3, which recovers heat from the two output liquid streams: pure distilled water 200 pumped from distillate pump 4 and concentrated residues 300 pumped at contaminant pump 5. Heated to within a few degrees of boiling temperature, the liquid 100 next passes through a start-up heater 6, then enters vacuum chamber 7 containing evaporator/condenser unit 8 comprising a plurality of dynamic film thermal plates (not shown). A vacuum pump 9 attached to a vacuum chamber 7 produces a vacuum to be attached inside the chamber 7. The liquid 100 boils as it passes through the evaporator condenser unit 8, and the water vapor is drawn off at 10 by a vapor compressor 11. The remaining concentrated contaminant liquid 300 flows out of the chamber 7 at point 12, carrying away all contaminants.

The pure water vapor 400 extracted by the vapor compressor 11, is pressurized raising its temperature 400A and injected into the condenser at 13, where its latent heat is released through the plates as it condenses into pure distilled water, thereby causing the contaminated liquid 100 to boil. Because most of the process heat is recovered and recycled within the heat exchanger 3 and the evaporator/condenser unit 8, overall specific energy requirements are significantly reduced in comparison with conventional distillation systems. Following the startup period, there is little or no energy required to directly heat the water. The only energy input needed to operate the system is used by the vapor compressor 11, four pumps 2, 4, 5, 9 and the controls (not shown). Purity of the output distilled water product is less than 10 ppm of total dissolved solids (TDS).

Figure 2:
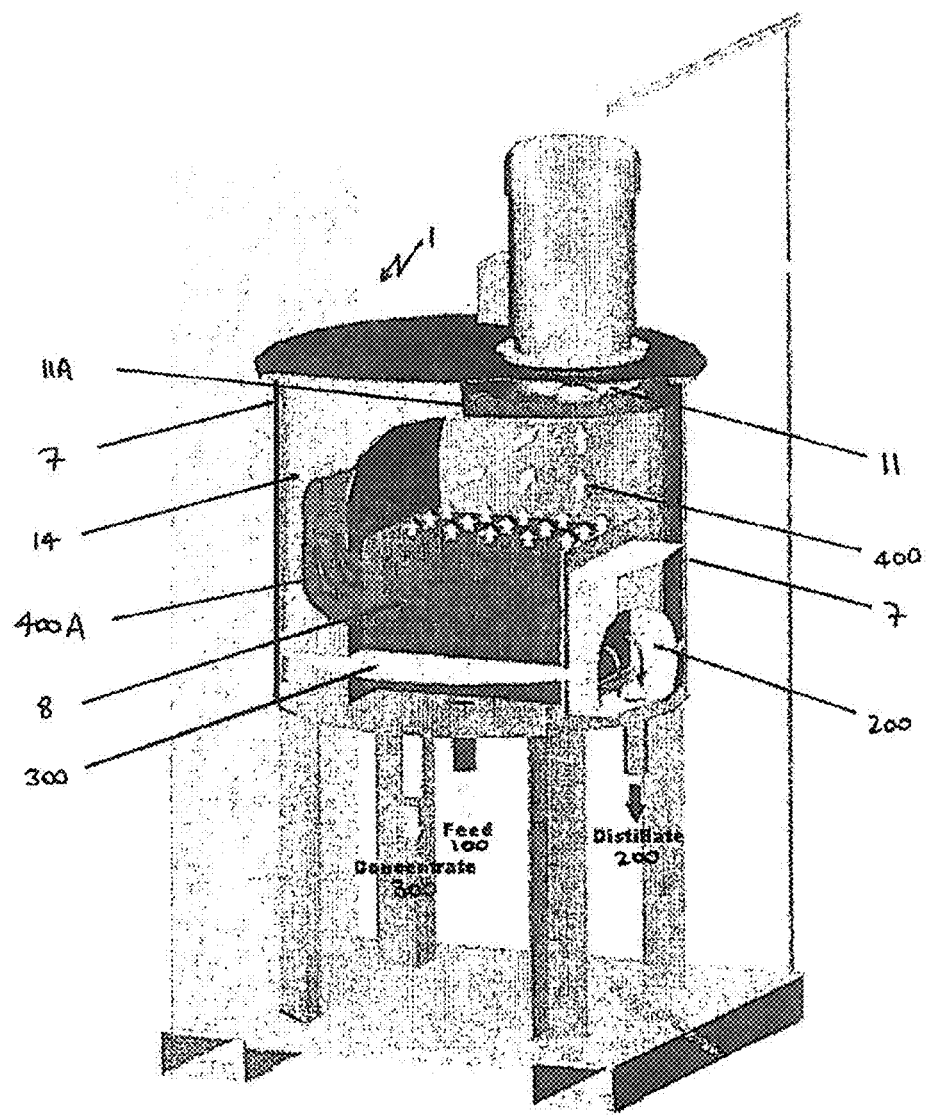
FIG. 2 shows a schematic sectional view of the distillation apparatus of the present invention.

FIG. 2 shows a schematic sectional view of the distillation apparatus 1. The vacuum chamber 7 housing the evaporation condenser units 8 is connected to the vapor compressor unit 11 contained in a vapor compressor housing 11A.

The evaporator condenser plates each have a boiling surface facilitating evaporation of the feed contaminated liquid 100 into water vapor 400 and a condensing surface facilitating condensing the water vapor 400A into distilled water 200. The latent heat released on condensing of the water vapor 400A into distilled water 200 is conducted through the plates which facilitate the boiling and evaporation of the feed contaminated, liquid 100 into water vapor 400. The plates are bonded or welded to prevent contamination of feed contaminated liquid 100 and distilled water 200.

The plates may be made from food containment metals such as titanium, stainless steel or aluminum. The plates have a surface morphology to produce a hydrophilic effect which enhances the latent heat transfer of the plates and preferably have a thickness of between 0.1 mm to 0.25 mm. The evaporator condenser 8 may be a rising film or falling film evaporator type and may operate under vacuum pressure or at atmospheric pressure.

The heated liquid feed 100 enters the vacuum chamber 7 under pressure and boils on contact with the boiling surface of the evaporator condenser plate. The resulting water vapor 400 is extracted by the vapor compressor 11 and injected under pressure (400A) back into the chamber 7 via a compressed water vapor duct 14. The latent heat of the compressed water vapor 400A is released through the evaporator condenser plates as the water vapor 400A condenses into pure distilled water 200 thereby causing the contaminated liquid 100 to boil. The boiling point of the contaminated liquid under vacuum in the vacuum chamber is preferably between 40° C. and 100° C. The two outputs of the distillation apparatus 1 are the waste concentrate 300 and distilled water 200 which exit from the apparatus 1.

Figure 3:
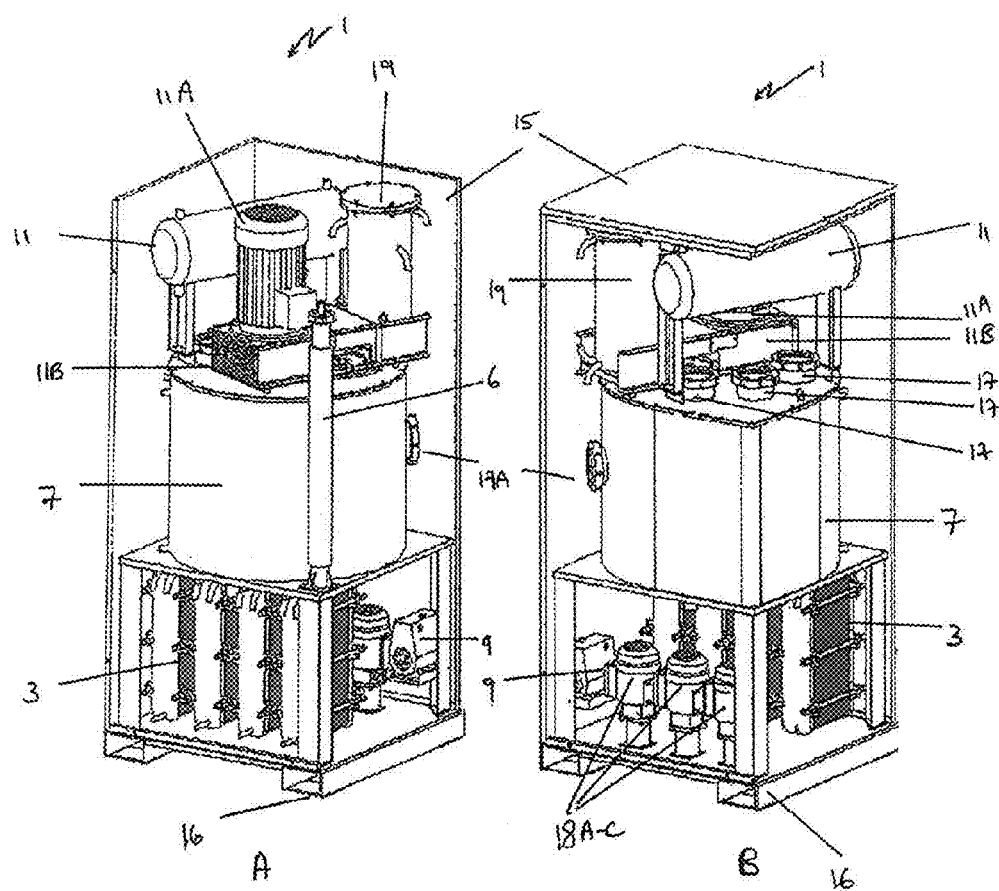
FIG. 3 shows perspective views A and B of the distillation apparatus of FIG. 2.
Figure 4:
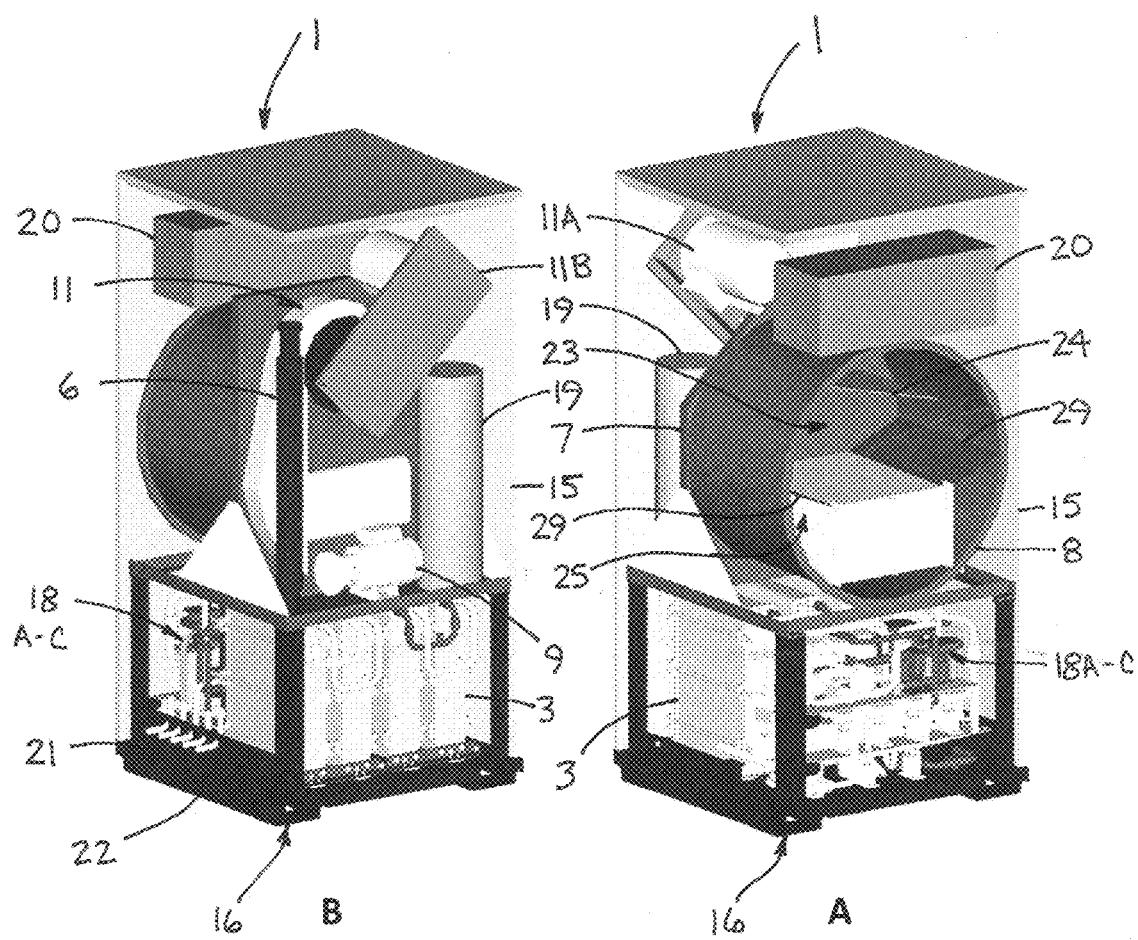
FIG. 4 shows schematic perspective views A and B of the distillation apparatus of FIG. 2.

FIGS. 3 and 4 show perspective sectional front views 3A, 4A and back views 3B, 4B of the distillation apparatus 1. The vacuum chamber 7 of the distillation apparatus 1 has a transparent and removable front panel (not shown) through which the evaporation condensing processes can be viewed and allowing service access to the evaporation condenser units 8 for maintenance. The removable panel is sealed with "P" or "D" shaped silicone seals to ensure vacuum integrity of the panel. The distillation apparatus 1 is optionally contained in an enclosure 15 including forklift base 16 for convenient portability. The vapor compressor 11 has an associated compressor drive motor 11A and belt drive contained in a housing 11B. Hatches 17 and 17A provide internal access to the chamber 7 for service and maintenance. Pumps 18A-C pump distilled water, feed contaminant liquid and waste concentrate to the heat exchanger 3. A degasser 19 separates non-condensable gasses from the heated contaminant liquid 100, such as oxygen from the air, in the inlet to the vacuum chamber 7 from the heat exchanger. Removal the build-up of such non-condensable gasses in the vacuum chamber 7 prevents coating of the evaporator condenser 8 and reduction of the efficiency of same.

Control of the distillation apparatus 1 operation cycle is fully automatic, via a control panel 20, from initial warm-up through distillation and shut down as well as a self-cleaning procedure. At intervals determined by the quality of the liquid 100, the distillation apparatus 1 ends the distillation cycle and starts the self-cleaning procedure which lasts approximately 100 minutes. Automatic fail-safe valve arrangements ensure that waste water 300 containing contaminant impurities cannot be mixed with the distilled water output product 200.

Service 21 and power access 22 provide further maintenance points to the base of the apparatus 1.

The vapor compressor 11 is separated from the vacuum chamber 7 by a separator 23. The vacuum chamber 7 includes at least one baffle 24 to accelerate vapor velocity within the vacuum chamber 7 and separate droplets of boiling liquid residues from the vapor. The vacuum chamber 7 also includes a vapor recycle means 25, such as a fan to re-circulate a portion of the water vapor inside the vacuum chamber 7, to accelerate water vapor condensation on the plates of the evaporator condenser 8. At least one partition 29 is also housed within the vacuum chamber 7 to separate the distilled water from the contaminant concentrate.

The evaporator condenser 8 maintains a higher pressure on the condensing side of the plates to ensure that, in the event of leakage occurring within or around the evaporator condenser, leakage will be from the distilled water into the contaminated liquid thus ensuring the quality of the distilled water output product is not compromised. The performance and status of the distillation apparatus 1 can be monitored from a remote location to minimize maintenance inspections and onsite personnel surveillance time.

Figure 5:
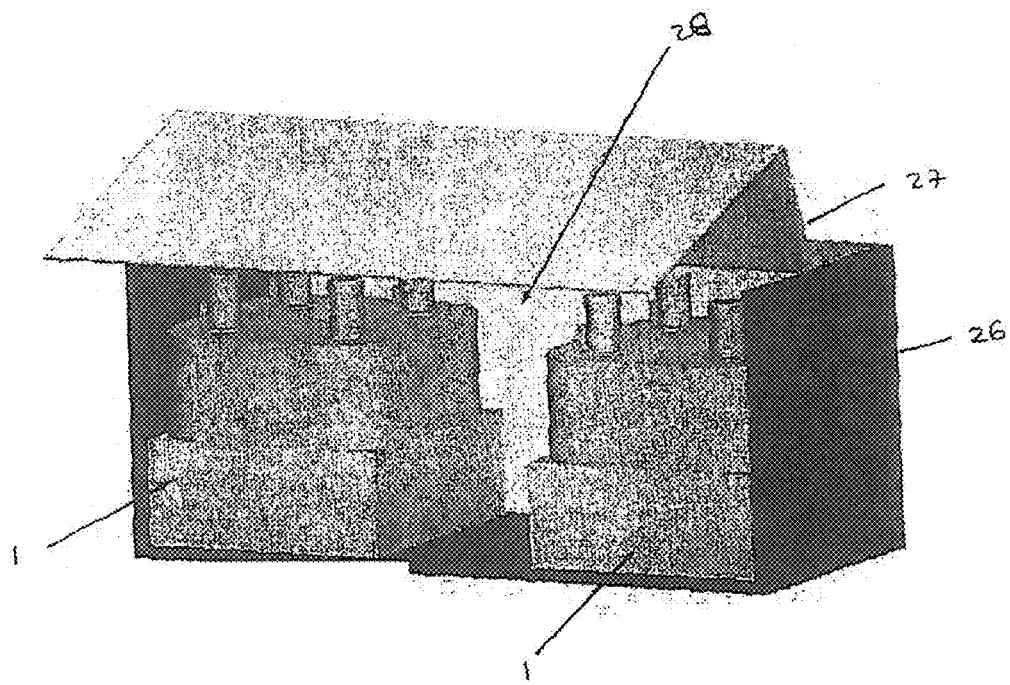
FIG. 5 shows a schematic perspective view of four apparatus of the present invention in an ISO shipping container.

FIG. 5 shows a schematic perspective view of two sets of four modules of the distillation apparatus 1 transported inside an ISO 20 foot shipping container 26 modified with a hydraulically operated roof 27 and wall 28 to provide service access to the distillation apparatus 1. Easy transportation of the distillation apparatus 1 enables efficient upscale production of distilled water at a particular site.

Applications of the distillation apparatus 1 include those situations where a secure drinking water supply is needed such as in emergency relief conditions or in manufacturing industry which require ultrahigh purity distilled water such as water bottling, dairy, finishing, glycol recovery, ground water remediation, desalination and waste water recycling and concentration industries, the food and beverage industry, microelectronics and pharmaceutical industries as well as toxic and hazardous waste recovery water treatment as well as providing emergency relief pure drinking water from water that has been contaminated naturally or by man.

Thus, preferred embodiments of the present invention may have a number of advantages over the prior art which may include:
- high purity distilled water production;
- environmentally friendly high purity distilled water production;
- fail-safe operation, irrespective of contaminant liquid quality;
- ability to process high solids liquids with minimal pre-treatment;
- vacuum induced low boiling temperature minimizes scale build-up and maintenance;
- easy to operate fully automated control system with remote monitoring and diagnostics;
- able to operate continuously for an uninterrupted extended period;
- built-in self-cleaning and sterilization with minimum on-site maintenance;
- compact design with small physical footprint enables easy portability and scalability;
- modular construction enables easy maintenance;
- improved energy efficiency resulting in lower operating cost, and
- readily portable to different locations.

Aspects of the present invention have been described by way of example only and it should be appreciated that modifications and additions may be made thereto without departing from the scope thereof as defined in the appended claims.

The claims defining the invention are:

1. A distillation apparatus for producing distillate from a contaminated liquid, comprising:
   a vacuum chamber and associated vacuum pump for creating a vacuum therein;
   an evaporator-condenser positioned within said vacuum chamber, said evaporator-condenser having a plurality of plates, each of said plurality of plates having a first surface for facilitating evaporation of the contaminated liquid into a vapor, and a second surface for facilitating condensation of a compressed vapor into a distillate;
   at least one partition positioned within said vacuum chamber for separating the distillate from the contaminated liquid;
   a vapor compressor for receiving the vapor from said vacuum chamber at a first temperature and pumping the compressed vapor back into said vacuum chamber at a higher temperature;
   at least one heat exchanger that recovers sensible heat from at least one of the distillate and a concentrate pumped from said vacuum chamber and preheats incoming contaminated liquid using the recovered heat; and
   a start-up heater for further heating the preheated contaminated liquid from said at least one heat exchanger before the preheated contaminated liquid enters said vacuum chamber,
   wherein condensation of the compressed vapor into the distillate by said second surface of said plurality of plates releases latent heat from the compressed vapor into said evaporator-condenser thereby evaporating the preheated contaminated liquid, and
   wherein said evaporator-condenser is a rising film or a falling film heat exchanger.

2. The distillation apparatus of claim 1, wherein said vacuum chamber includes at least one transparent and removable panel.

3. The distillation apparatus of claim 1, wherein said vapor compressor re-circulates a portion of the vapor inside said vacuum chamber.

4. The distillation apparatus of claim 1, wherein each of said plurality of plates is non-porous.

5. The distillation apparatus of claim 4, wherein at least one of said first surface and said second surface of said plurality of plates is hydrophilic.

6. The distillation apparatus of claim 1, wherein said vacuum chamber further includes at least one baffle to accelerate vapor velocity within said vacuum chamber and separate droplets of boiling liquid residues from the vapor.

7. The distillation apparatus of claim 1, wherein said vapor compressor maintains a higher pressure on said second surface than on said first surface of each of said plurality of plates.

8. The distillation apparatus of claim 1, wherein each of said plurality of plates has a thickness between 0.1 mm and 0.25 mm.

9. The distillation apparatus of claim 1, further comprising pumps for pumping the contaminated liquid through said at least one heat exchanger and into said vacuum chamber, and the distillate and concentrate from said vacuum chamber through said at least one heat exchanger.

10. The distillation apparatus of claim 1, wherein a higher pressure on said second surface of said plurality of plates in said evaporator-condenser than a pressure on said first side of said plurality of plates ensures fail safe distillation.

11. The distillation apparatus of claim 1, wherein the distillation apparatus operates as a standalone unit.

12. The distillation apparatus of claim 1, wherein said evaporator-condenser boils the contaminated liquid in a temperature range of 40° C. to 100° C.

13. The distillation apparatus of claim 1, wherein the distillation apparatus may be transported with one or more distillation apparatus in international standard organization (ISO) shipping containers.

14. The distillation apparatus of claim 1, wherein said vapor compressor is integral to said vacuum chamber.

15. A distillation apparatus for producing distillate from a contaminated liquid, comprising:
   a vacuum chamber having an evaporator-condenser positioned therein, said evaporator-condenser having a plurality of non-porous plates, each of said plurality of non-porous plates having a thickness between 0.1 mm and 0.25 mm, a first surface for facilitating evaporation of the contaminated liquid into a vapor and a concentrate, and a second surface for facilitating condensation of a compressed vapor into a distillate;
   a vapor compressor for extracting the vapor from said vacuum chamber and transferring the compressed vapor back into said vacuum chamber;

at least one heat exchanger that recovers heat from the distillate and the concentrate exiting said vacuum chamber and preheats incoming contaminated liquid using the recovered heat; and a heater for further heating the preheated contaminated liquid from said heat exchanger before the preheated contaminated liquid enters said vacuum chamber wherein said plurality of non-porous plates have hydrophilic outer surfaces.

16. The distillation apparatus of claim 15, wherein condensation of the compressed vapor into the distillate by said second surface of said plurality of plates releases heat from the compressed vapor into said evaporator-condenser thereby further heating the preheated contaminated liquid.

17. The distillation apparatus of claim 15, wherein said vacuum chamber includes at least one transparent panel.

18. The distillation apparatus of claim 15, wherein said evaporator-condenser boils the contaminated liquid in a temperature range of 40° C. to 100° C.

19. A method of producing distillate from a contaminated liquid, comprising the steps of:

positioning an evaporator-condenser having a plurality of plates within a vacuum chamber, said evaporator-condenser being a rising film or a falling film heat exchanger;

creating a vacuum in said vacuum chamber;

pumping a contaminated liquid into a heat exchanger for preheating the contaminated liquid using recovered heat;

initially heating the preheated contaminated liquid from said heat exchanger before the preheated contaminated liquid enters said vacuum chamber;

facilitating evaporation of the contaminated liquid into a vapor and a concentrate by contacting the contaminated liquid with a first surface of a plate of said plurality of plates;

separating the distillate from the contaminated liquid using at least one partition positioned within said vacuum chamber;

extracting the vapor from said vacuum chamber at a first temperature;

compressing the extracted vapor and transferring the compressed vapor back into said vacuum chamber at a higher temperature;

facilitating condensation of the compressed vapor into a distillate with a second surface of a plate of said plurality of plates; and heating the preheated contaminated liquid within said evaporator-condenser using latent heat released from the compressed vapor.

20. The method of producing distillate from a contaminated liquid of claim 19, further comprising the step of recovering sensible heat from at least one of the distillate and the concentrate leaving said vacuum chamber; and using the recovered sensible heat for preheating the contaminated liquid in said heat exchanger.

21. The method of producing distillate from a contaminated liquid of claim 19, further comprising the step of accelerating vapor condensation inside said vacuum chamber using at least one baffle positioned therein.

22. The method of producing distillate from a contaminated liquid of claim 20, further comprising the step of re-circulating the vapor inside said vacuum chamber to accelerate vapor condensation on said plurality of plates.

23. The method of producing distillate from a contaminated liquid of claim 19, further comprising the step of pumping the distillate from said vacuum chamber and through said heat exchanger.

24. The method of producing distillate from a contaminated liquid of claim 19, wherein the step of facilitating evaporation occurs in a temperature range of 40° C. to 100° C.

* * * * *

UNITED STATES PATENT AND TRADEMARK OFFICE
CERTIFICATE OF CORRECTION

PATENT NO. : 8,771,478 B2  Page 1 of 1
APPLICATION NO. : 12/597620
DATED : July 8, 2014
INVENTOR(S) : Ward It is certified that error appears in the above-identified patent and that said Letters Patent is hereby corrected as shown below:

In the claims

Column 7, line 7, please insert a -- , -- after chamber

Signed and Sealed this
Twenty-ninth Day of December, 2015

Michelle K. Lee
*Director of the United States Patent and Trademark Office*